United States Patent [19]
Grilk

[11] Patent Number: 5,841,359
[45] Date of Patent: Nov. 24, 1998

[54] VISUAL ALARM GAUGE

[75] Inventor: Henry Garratt Grilk, Lancaster, Pa.

[73] Assignee: Datcon Instrument Company, East Petersburg, Pa.

[21] Appl. No.: 832,335

[22] Filed: Mar. 26, 1997

Related U.S. Application Data

[63] Continuation of Ser. No. 381,076, Jan. 31, 1995, abandoned.

[51] Int. Cl.$^6$ .................................................. G08B 21/00
[52] U.S. Cl. ......................... 340/688; 340/686; 340/438; 73/1.37
[58] Field of Search .................................. 340/687, 688, 340/438, 686; 73/1.37

[56]  References Cited

U.S. PATENT DOCUMENTS

| | | | |
|---|---|---|---|
| 3,441,740 | 4/1969 | De Cloux et al. ...................... | 340/688 |
| 3,509,529 | 4/1970 | Utter ........................................ | 340/52 |
| 3,622,975 | 11/1971 | Vanderberg .............................. | 340/57 |
| 3,739,337 | 6/1973 | Hill .......................................... | 340/59 |
| 3,927,390 | 12/1975 | Hill .......................................... | 340/60 |
| 4,417,231 | 11/1983 | Watt ......................................... | 340/52 |
| 4,513,277 | 4/1985 | Moore et al. ............................. | 340/59 |
| 4,823,117 | 4/1989 | Burcham ................................. | 340/626 |
| 4,836,011 | 6/1989 | Dombrowski et al. .................... | 73/4 R |
| 5,050,423 | 9/1991 | Czarnocki ................................ | 73/4 R |
| 5,051,729 | 9/1991 | Gray ........................................ | 340/626 |
| 5,121,109 | 6/1992 | Murphy, Jr. et al. ................... | 340/688 |

OTHER PUBLICATIONS

Datcon Instrument, Tach. Products & Electronic Speedometers.
Howell Digital Indicators, Howell Instruments, Inc.

*Primary Examiner*—Jeffery A. Hofsass
*Assistant Examiner*—Julie Lieu
*Attorney, Agent, or Firm*—Dan Williams

[57]  ABSTRACT

A panel meter having an integrated warning light activated by an abnormal operating condition. The meter embodies a conventional electrical meter movement having dial and pointer. The pointer, connected to an armature, is rotatable by the interaction of a magnetic armature with a varying magnetic field generated by varying a sender current in wound coils. Integrated into the meter and on a surface mount printed circuit board between the dial and coils are the components and wiring traces of a dual comparator circuit that activates a light emitting diode signal lamp when a high or low limit operating condition is reached. The signal lamp is fully integrated and mounted on the circuit board and viewable through an aperture in the dial. The same circuit board is usable for high and low limit sensing devices by choosing the position of a resistor located between the comparator collector and the light emitting diode.

9 Claims, 5 Drawing Sheets

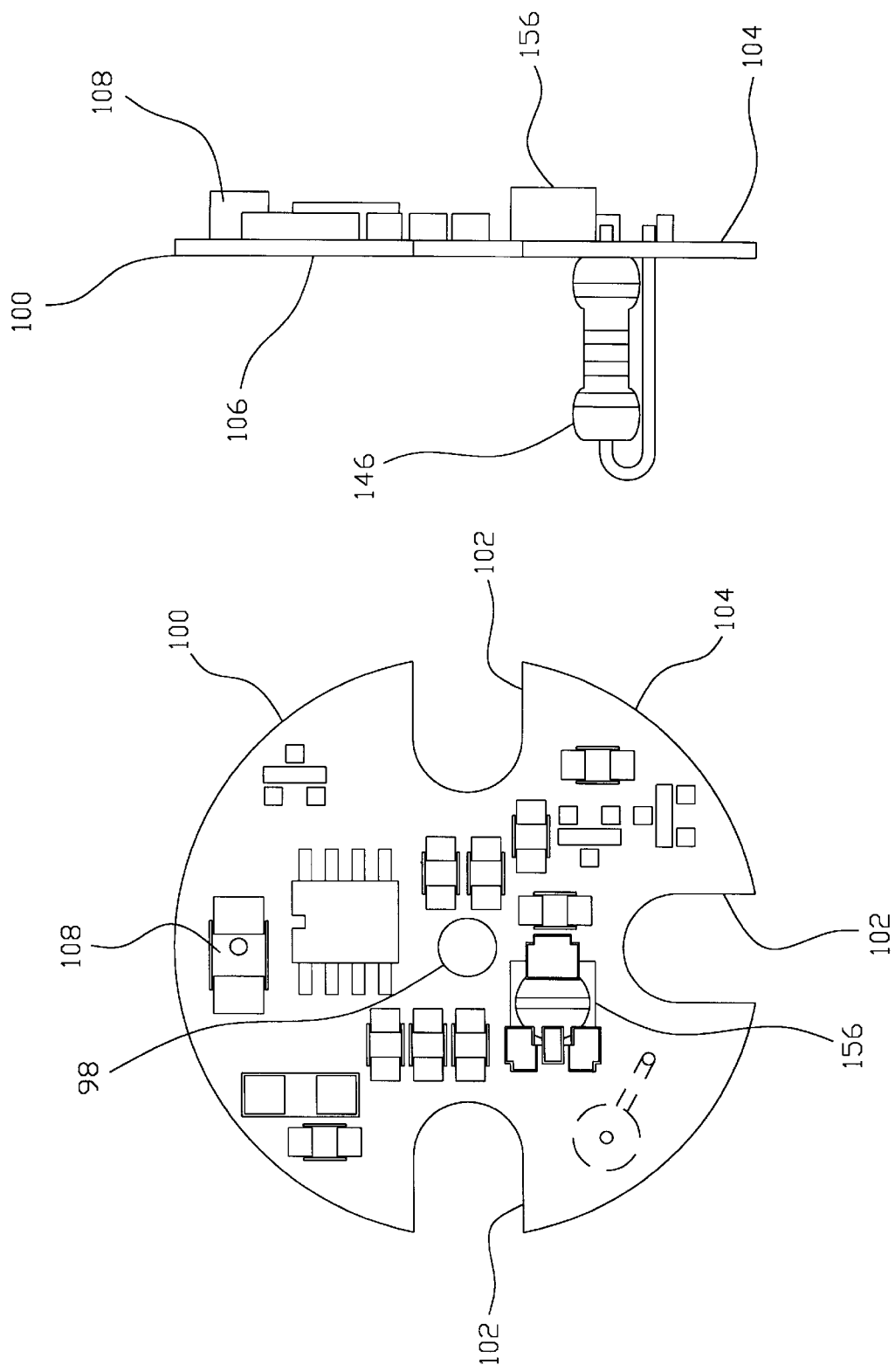

VISUAL ALARM GAUGE

This application is a continuation of application Ser. No. 08/381,076 filed Jan. 31, 1995 now abandoned.

BACKGROUND

1. Field of the invention

The present invention relates to indicating gauges used to display operating conditions in remote pieces of machinery. More particularly, the present invention relates to indicating gauges such as fuel level gauges, voltmeters, oil pressure gauges, water and oil temperature gauges, voltmeters, ammeters, pyrometers and the like, that display operating conditions by rotation of a pointer driven by the magnetic interaction between an armature and electrical coils.

2. Description of the Related Art

Monitoring of internal combustion engines has long been done by the use of indicating gauges located external to the engine. Typically, a sensor is positioned at an appropriate point within the engine and the sensor's output is electrically transmitted to a gauge. One type of gauge, often called a panel meter gauge, is housed in a small cylindrically shaped case, two inches diameter being a standard modular size, having a lens at one end and lead-in terminals at the other end. The case is designed to facilitate mounting on a generally flat mounting surface. These modular gauges are often mounted in a cluster so that the machine operator can assess fuel level, oil pressure, oil temperature, water temperature, and other conditions at a single glance. Because these gauges are modular and can be used for many purposes, they are produced in high volume and as a result, costs are kept low.

Indicating electrical panel meter gauges typically include an inner case which electro-magnetically isolates electrical components, a movement having two coils wound around the outside of an armature, a dial face, a pointer, and a case. The armature rotates freely within the coils and aligns with the varying magnetic field produced by the amount of current flowing through the coils. The pointer, fixed to the armature, indicates the operating condition on a calibrated dial face. When coupled to a suitable sender, the assembly may be calibrated to indicate pressure, temperature, fuel levels, or voltage.

Indicating gauges are sometimes entirely eliminated. In these situations, reliance is placed on warning lights that signal when extreme operating conditions occur. Drivers are familiar with high coolant temperature lights and low oil pressure lights.

In some gauge systems, indicating gauges may be combined with warning lights. Many cars now have low fuel warning lights as well as an indicating gauge. Another example is a high coolant temperature light in combination with a gauge that continuously indicates coolant temperature. Separate indicator lights, however, require additional lamps and lamp housings as well as duplicative sending apparatus such as senders, detectors or switches.

Present gauge/warning light combinations require either dual senders, a combination sender switch, or a detection module external to the gauge to simultaneously activate both the light and gauge. Additional labor and component expense is required to wire and install the additional electrical components. Present combinations also require additional connectors which reduce the reliability of the overall system.

Each device in existing gauge/warning light combinations must also be separately calibrated. For example, the warning light must be matched and calibrated to its sender or detection module and the gauge must be calibrated to its sender. Independent calibration inevitably means that lamp signals will not be properly synchronized with the indicator of measuring gauge.

Most importantly, no existing panel meter/alarm lamp system can be retrofitted into preexisting applications without significant expense being incurred for additional wiring and electrical components.

What is needed is a product that can incorporate an indicating meter movement and an indicating light in the same modular gauge housing. This product should require only one wire from the sending unit so that it can be retrofitted into existing applications with no additional wiring. Moreover, the gauge and lamp should be arranged such that a single calibration effort calibrates both gauge and light.

Another desirable feature would be to provide the gauge with some means to allow standard production design gauges to be triggered at various trigger points. In this way trigger points could be factory set for each customers requirements thus allowing factory produced gauges to be easily customized.

SUMMARY OF THE INVENTION

The present invention overcomes the aforementioned disadvantages of prior art panel meter gauge/warning light combinations. An object of the present invention is to reduce the installed system cost by necessitating installation of only a single sender in the system and not the dual sender, sender plus a detection module, or sender plus a switch presently required.

Another object of the present invention is to provide a visual alarm gauge which may be retrofitted into existing apparatus without a requirement for additional wiring, detection modules, or senders.

Still another object of the present invention is provide a visual alarm gauge system, capable of being installed as original equipment, which has a single external input wire. This minimizes the customers installed system cost because of a reduction in the cost and complexity of wiring.

Yet another object of this invention is to provide a visual alarm gauge which may be easily customized to a customers desired trigger point.

Another object of this invention is to provide a visual alarm gauge which is inherently more accurate, reliable, and robust than existing gauge/warning light combinations.

These and other objects are realized by integrating an electronics package and visual warning indicator into a standard panel meter gauge. A single lead from a sender conducts an analog electrical signal from the sender to the meter. Inside the meter's case, a detection circuit and light are mounted on a printed circuit board. Through use of a trimming potentiometer the detection circuit may be calibrated during gauge manufacture to trigger the alarm light at a variety of set points. Changing the resistance value of a meter calibration resistor and the dial screen changes the panel meters application. For example, a meter design is changed from voltmeter to ammeter merely by changing the calibration resistor and dial.

This integrated visual warning gauge is housed in a non metallic case. A conventional electrical movement is placed within the case. The movement is a coil-armature arrangement positioned within a metallic can that provides electromagnetic shielding. A printed circuit board, with an appropriate aperture through which the spindle passes is positioned over the coil and armature and soldered to metallic terminal studs which extend through the coil assembly. All soldering connections of both the coils and circuit board are made to the studs. These studs extend through the can and case and terminate as electrical contact studs projecting from the case.

The printed circuit board contains surface mount electrical components including a light, preferably a light emitting diode, mounted on the board. A dial face with an aperture over the light and another through which the spindle may pass is mounted over the printed circuit board and securely fastened, preferably to the can.

A pointer is pressed on the spindle before assembly is completed by placing a mask, gasket, and crystal over the case and sealing the unit by crimping a bezel over a flange on the case.

The integrated electrical circuit on the printed circuit board is a dual comparator circuit with an adjustable trim pot that allows the alarm light to be calibrated after assembly. The printed circuit receives its electrical input in parallel with the electrical gauge. Electrical wiring leads for the visual alarm gauge are those of a typical electrical gauge, namely sender, ignition (battery), and ground connections. The sender, battery, and ground connections are used by both the electrical movement and printed circuit board thus requiring only the pre-existing conventional wiring to energize the entire visual alarm gauge.

The gauge of the present invention can be retrofitted in place of prior art electrical gauges with no additional components or wiring. The invention provides a visual alarm gauge that is easily customizable for a variety of applications and is installable with only a single wiring connection to the sender.

BRIEF DESCRIPTION OF THE DRAWINGS

These and other features, aspects, and advantages of the present invention will become better understood with regard to the following description, appended claims, and accompanying drawings where:

FIG. 4 is a top view of the printed circuit board showing an arrangement of the electrical components;

FIG. 5 is a side view of the printed circuit board of FIG. 3; and

DESCRIPTION

Although the disclosure herein is detailed and exact to enable those skilled in the art to practice the invention, the physical embodiments herein disclosed merely exemplify the invention which may be embodied in other specific structures. The scope of the invention is defined in the claims appended hereto.

The visual alarm panel meter gauge of the present invention consists essentially of a printed circuit board containing an electrical sensing circuit mounted within the same instrument case as an electrical gauge. The printed circuit board containing a dual comparator circuit activates a signal light mounted on the printed circuit board. An aperture in the dial allows visual observation of the signal light when an abnormal operating condition is sensed.

Figure 1:
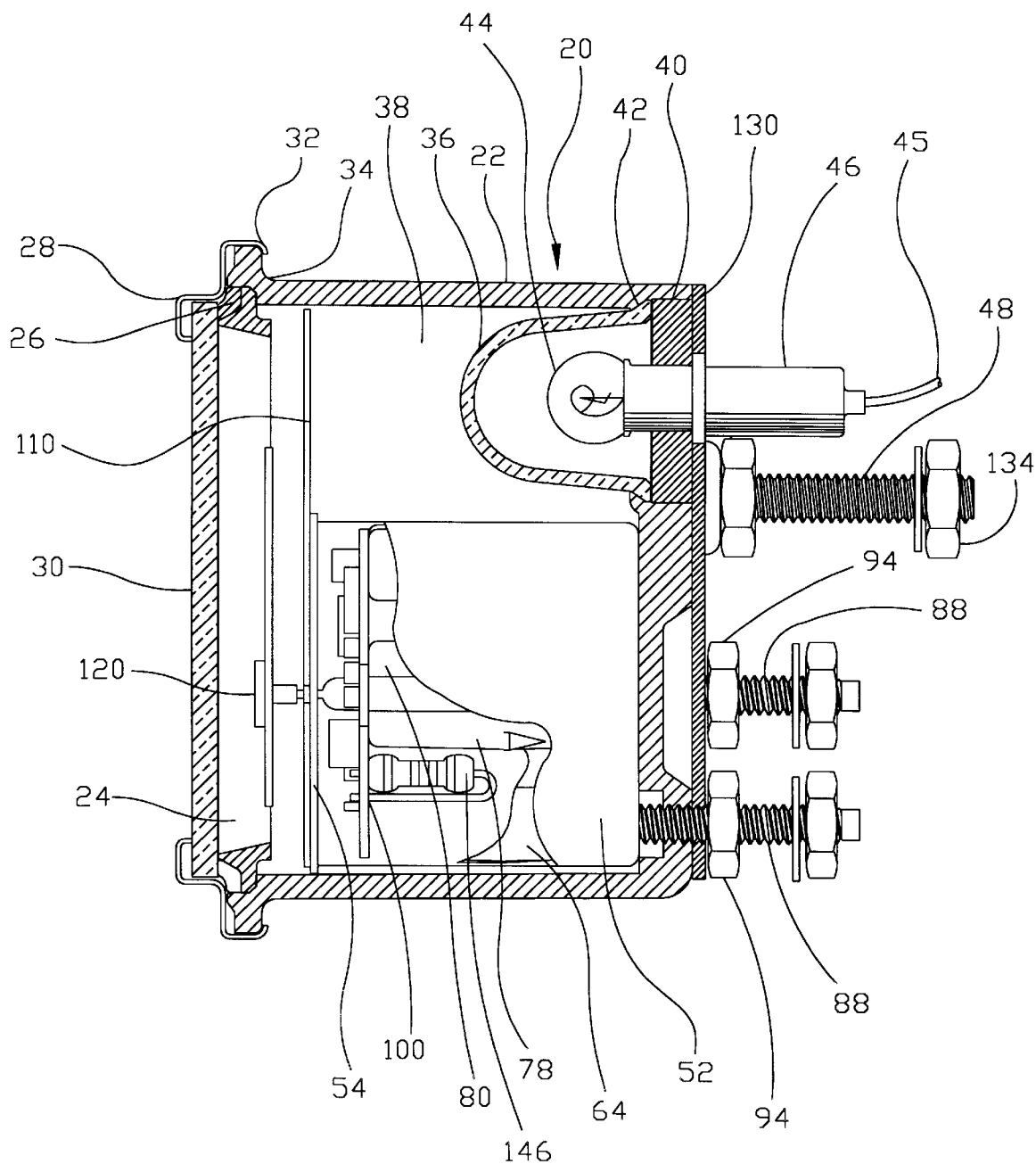
FIG. 1 is side partial sectional view of a gauge showing my invention.
Figure 2:
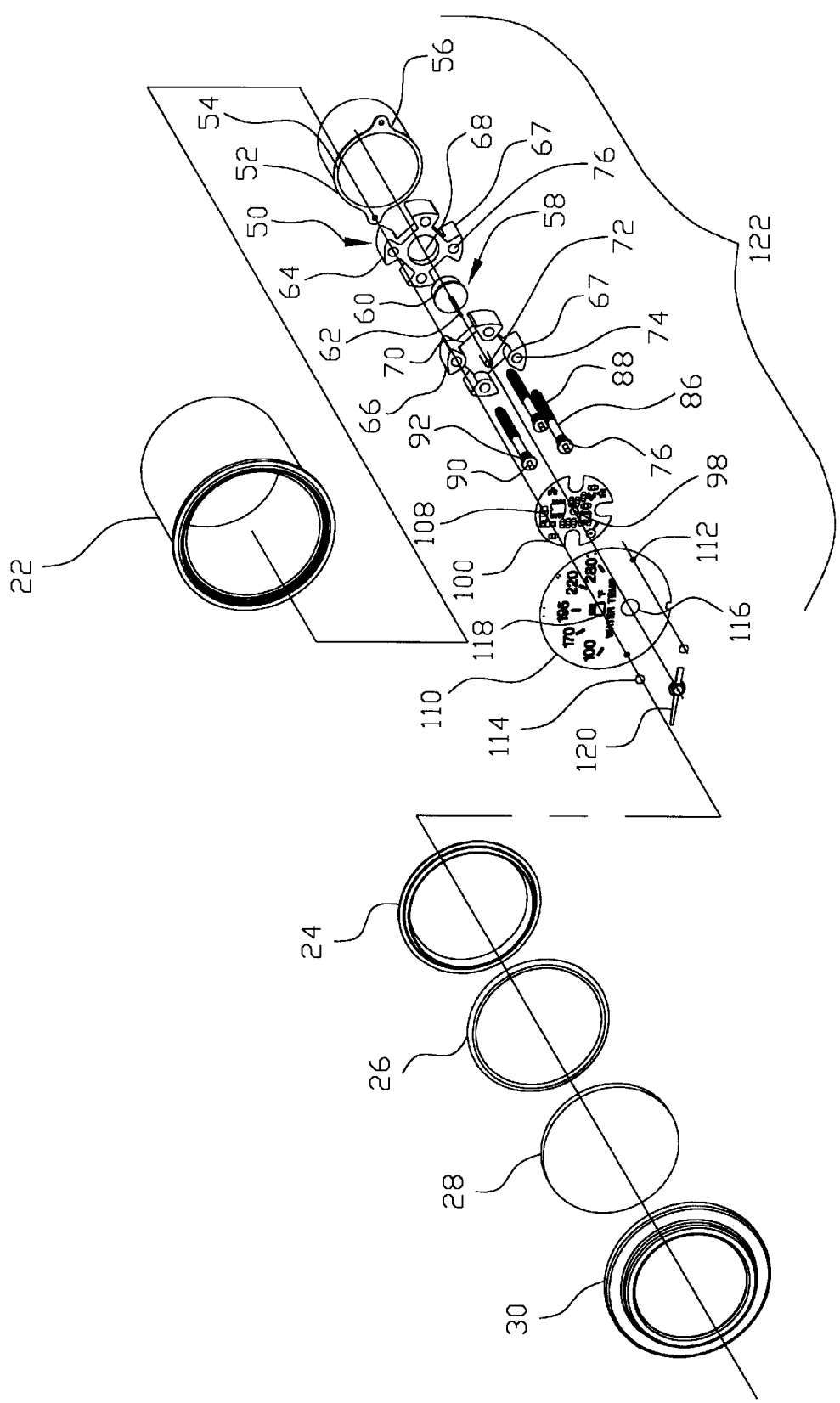
FIG. 2 is an exploded front right projection view of a gauge showing the invention of FIG. 1.

The overall assembled layout of the visual alarm gauge is illustrated in FIG. 1 as a partial cross sectional view and in FIG. 2 as an exploded diagram. The external portion of gauge 20 consists of case 22, mask 24, gasket 26, crystal 28, and bezel 30. Case 22 and mask 24 are typically molded from plastic in order to minimize costs, however, these parts may also be metallic. Mask 26 rests in a recess formed into case 22 and provides a mounting plane for crystal 28. The intersection of case 22 and mask 24 provides another recess into which gasket 26 may be inserted. Gasket 26 is a soft flexible material chosen for resistance to aging caused by sunlight and ozone. Ethylene propylene is preferred but other elastomers are acceptable. Crystal 28 is a clear material such as polycarbonate suitable for through viewing. Of course, other clear solid or laminated plastics or glass may be used as the crystal.

The gauge is sealed by bezel 30 pressing against crystal 28 sufficiently hard to partially compress gasket 26. During gauge assembly, bezel 30 is pressed against crystal 28 while edge 32 is rolled over flange 34 of case 22. Preferably bezel 30 is a thin gauge aluminum alloy which is inexpensive and easily roll formed around flange 34. Less desirable but acceptable bezel materials are malleable ferrous and copper based alloys.

Clear lens 36 is integrated into the rear portion of case 22 and serves as a housing for a lamp 44 which illuminates gauge interior 38. Lens 36 is separately molded from a clear plastic and cemented to ledge 42 abutting aperture 40 in case 22. Lamp housing 46 in contact with lamp ground plate 130 provides an electrical path to ground. Lamp 44 is separately energized by routing lamp lead wire 45 from a separate external switch (not shown).

The exploded view of FIG. 2 illustrates the location and components of indicating subassembly 122. Movement 50 is housed within inner case 52. Case 52 is preferably a magnetic material providing electromagnetic shielding for the component parts housed therein. Desirably, case 52 is a ferrous alloy that can be readily deep drawn and formed with integral flange 54 and ears 56.

Armature 58, comprised of magnet 60 and spindle 62, is positioned between back bobbin 64 and front bobbin 66 in cavity 68 with spindle 62 extending through aperture 72 of front bobbin 66. The bobbins are injection molded with mating catches (not shown) so that when pressed together, the bobbins snap together providing a non-metallic bobbin assembly mandrel over which magnet wire coils are wound. Bore 74 of front bobbin 66 is aligned with bore 77 of back bobbin 64 providing clear passage through the assembled bobbin assembly mandrel.

After the back and front bobbins are snapped together to form an assembled mandrel, coils 78 and 80 are wound perpendicular to each other around flat portions 70 of the assembled mandrel. The coils are wound with readily obtainable magnet wire. Terminal studs 86 pass through bores 74 and 76 of the front bobbin and back bobbin. Desirably, terminal studs 86 comprise head 90, knurl 92 and thread 88. As stud 86 is inserted into bore 74, thread 88 passes freely through bores 74 and 76. Knurl 92 interferes with bore 74 and when stud 86 is pressed home, the interference fit between knurl 92 and bore 78 hold stud 86 in place with head 90 extending from front bobbin 66 and thread 88 protruding from back bobbin 76. Wiring leads from coils 78 and 80 are soldered to head 76.

Printed circuit board 100, seen in FIGS. 1–5, has electrical components soldered onto component face 104. Desirably, board 100 is a surface mount board with copper traces providing conductive routing between selected positions on the board. "See-thru" green epoxy based polymer covers the copper conductive layer except for those regions where electrical connections or components are to be soldered to the copper. This type of arrangement allows electrical components to be surface mounted on and then soldered to face 104. Rear face 106 of board 100 presents a non metallic surface which may be placed directly over coils 78 and 80 without fear of electrical shorting. In preferred embodiment, gage calibration resistor 146, which shunts current away from coils 78,80 and balances and matches the coils to the sender, is mounted on rear face 106 and soldered from face 104 where the resistor leads emerge from through mounting holes in board 100. As best seen in FIG. 1, when board 100 is positioned above coils 78, 80, resistor 146 extends between bobbin shoulders 67 of bobbins 64,66.

Although surface mount printed circuit board is most appropriate for this invention because of the size available therefrom, it should be apparent that a through hole circuit board could be used to mount electronic components. If a through hole circuit board is utilized it may be desirable to insert a non metallic insulating spacer between the board and coils 78,80.

In the preferred embodiment, light 108 is surface mounted to board 100, however in alternate embodiments, light 108 may be positioned at other locations within the gauge case such as on the dial or extending from the dial. Desirably, light 108 is a ultra-high brightness multipoint junction light emitting diode. However it is also contemplated and within the scope of this invention that incandescent lights or other types of LED's may be used as light 108. Light 108 is activated by a suitable electrical circuit integrally contained on board 100. Of course, it will be readily apparent that if light 108 is an incandescent light, a higher powered switching circuit than the detection circuit described in this disclosure would be required.

Figure 6:
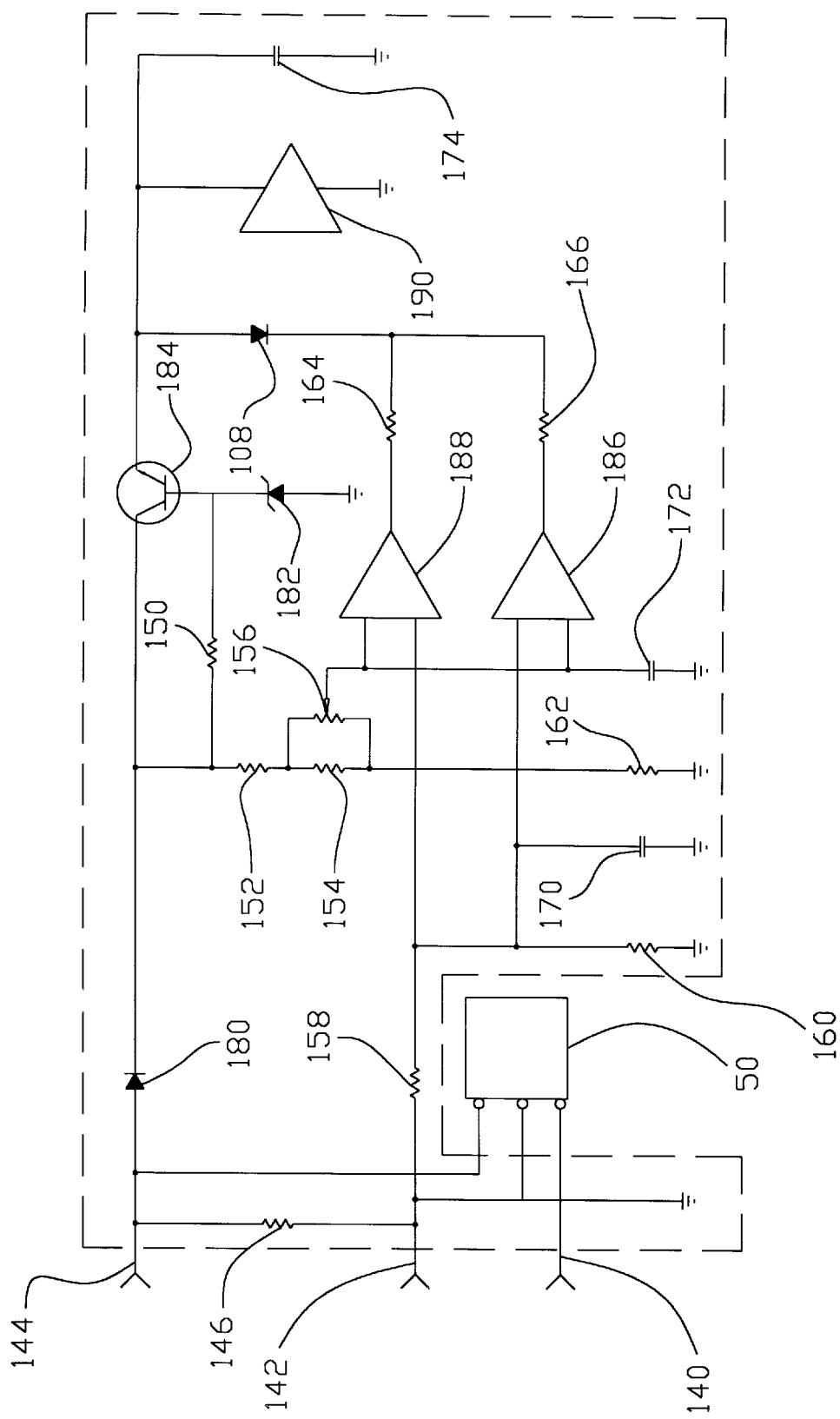
FIG. 6 is a circuit diagram of one embodiment of my invention.

Electric circuitry is best seen in FIG. 6 wherein the area bounded by the dashed line represents board 100. Leads 140, 142, and 144 represent the input leads to the board and are electrically connected to threads 88 emanating from the rear of case 22 as seen from FIGS. 1 and 6. Lead 140 is a ground terminal which is also connected to electrical movement subassembly 50. Lead 144 is connected to a positive voltage source such as a battery. A sending unit (not shown) provides a variable analog voltage source for lead 142.

On board 100, gauge calibration resistor 146 is mounted between lead 142 and 144 to shunt current away from coils 78, 80 of movement subassembly 50. The value of resistor 146 is chosen to balance the current in the coils and match the movement of pointer 120 to the sending unit. Sender lead 142 is connected to resistor 158 which is thence connected through resistor 160 to ground and to voltage comparators 186 and 188. Resistor 158 is also connected to ground through by-pass capacitor 170 which provides a filter effect and prevents noise spikes from affecting direct current voltages applied to comparators 186 and 188. Resistor 158 and resistor 160 form a voltage divider which decreases the relatively high sender voltage to a level that can be addressed by the comparators.

Lead 144 is connected to diode 180 providing reverse polarity protection for the circuit. Diode 180 is also connected to the collector of transistor 184, to resistor 150 and to resistor 152. Resistor 152 is connected to the parallel circuit of resistor 154 and variable resistor 156. The parallel circuit of resistor 154 and 156 is also connected to ground through resistor 162. Resistor 162 and 152 provide a voltage divider to provide a reference voltage for the comparators. Resistors 154 and variable resistor 156 form a trimming circuit that can be used to adjust the comparator reference voltage to a more exact value. Through use of the trimming circuit, activation of light 108 can be adjusted for each application.

Resistor 150 is connected to the base of transistor 184 and to zener diode 182. Zener diode 182, resistor 150 and transistor 184 form a voltage regulator providing a stable voltage reference to power the comparator integrated circuit and drive LED 108. The emitter of transistor 184 is connected to LED 108 providing a voltage source for integrated circuit 190. The emitter is grounded through filter capacitor 174 preventing noise spikes from affecting the voltage regulator.

Integrated circuit 190 represents the input voltage source for comparators 186, 188 and all lead pins are located on the same integrated circuit. The integrated circuit contains both comparators 186 and 188 on a single dual comparator integrated circuit such as a National Semiconductor LM2903.

Comparator 186 is connected to diode 108 through resistor 164. Comparator 188 is connected to diode 108 through resistor 166. However, resistor 164 and 166 are never on the same circuit and are illustrated this way merely for convenience. When the abnormal operating condition to be sensed by the comparator circuit and activate LED 108 is lower than the normal operating value, such as in a fuel level or oil pressure gauge, resistor 164 is in the circuit but resistor 166 is omitted. When resistor 166 is omitted the collector of comparator 188 is open and LED 108 is activated by comparator 188 through resistor 164. However, in a gauge where the voltage to be sensed from an abnormal operating condition is higher than the operating voltage range, as in coolant temperature, resistor 166 is in the circuit but resistor 164 is not in the circuit. The omitted resistor opens the circuit from the collector of comparator 188 allowing LED 108 to be activated by comparator 186. As previously mentioned, diode 108 is desirably an ultra-high brightness multipoint junction light emitting diode.

Board 100 is positioned over coils 78, 80 so that notches 102 surround terminal stud heads 90. When properly positioned, aperture 98 of board 100 is aligned with and permits passage of spindle 62. Adjacent to notches 102 on face 104 and part of the printed circuit are bare conductive terminal areas (not shown) which correspond to leads 140, 142 and 144, each of which is soldered to one of head 90. Studs 86 provide a conductive path from thread 88 to coils 78 and 80 as well as to board 100.

Inner case 52 is provided with rear openings (not shown) through which threads 88 may pass. Suitable projections may be formed directly into the rear shoulders of bobbin 64 so that when the wound bobbins are positioned within case 52 non-metallic material from the bobbin projections contact the case and provide electrical insulating space between case 52 and threads 88 where the threads project through the case.

The subassembly comprising coils 78,80, bobbins 64,66 armature 58, studs 86 and board 100 is positioned within inner case 52 with threads 88 extending through the rear openings of case 52. Dial 110 is positioned over flange 54. Dial 110 is secured to case 52 by rivets 114 staked through dial orifices 112 to ears 56.

Dial 110 is provided with hole 116 through which spindle 62 extends. Light 108 mounted on board 100 is visible through opening 118 on dial 110. Dial 110 is printed or silk screened with a legend that indicates the medium being measured and the units of measurement. Pointer 120 is pressed on the extending spindle 62 providing complete integration of the electronics package including light 108 with the movement subassembly 50 into indicating subassembly 122.

Figure 3:
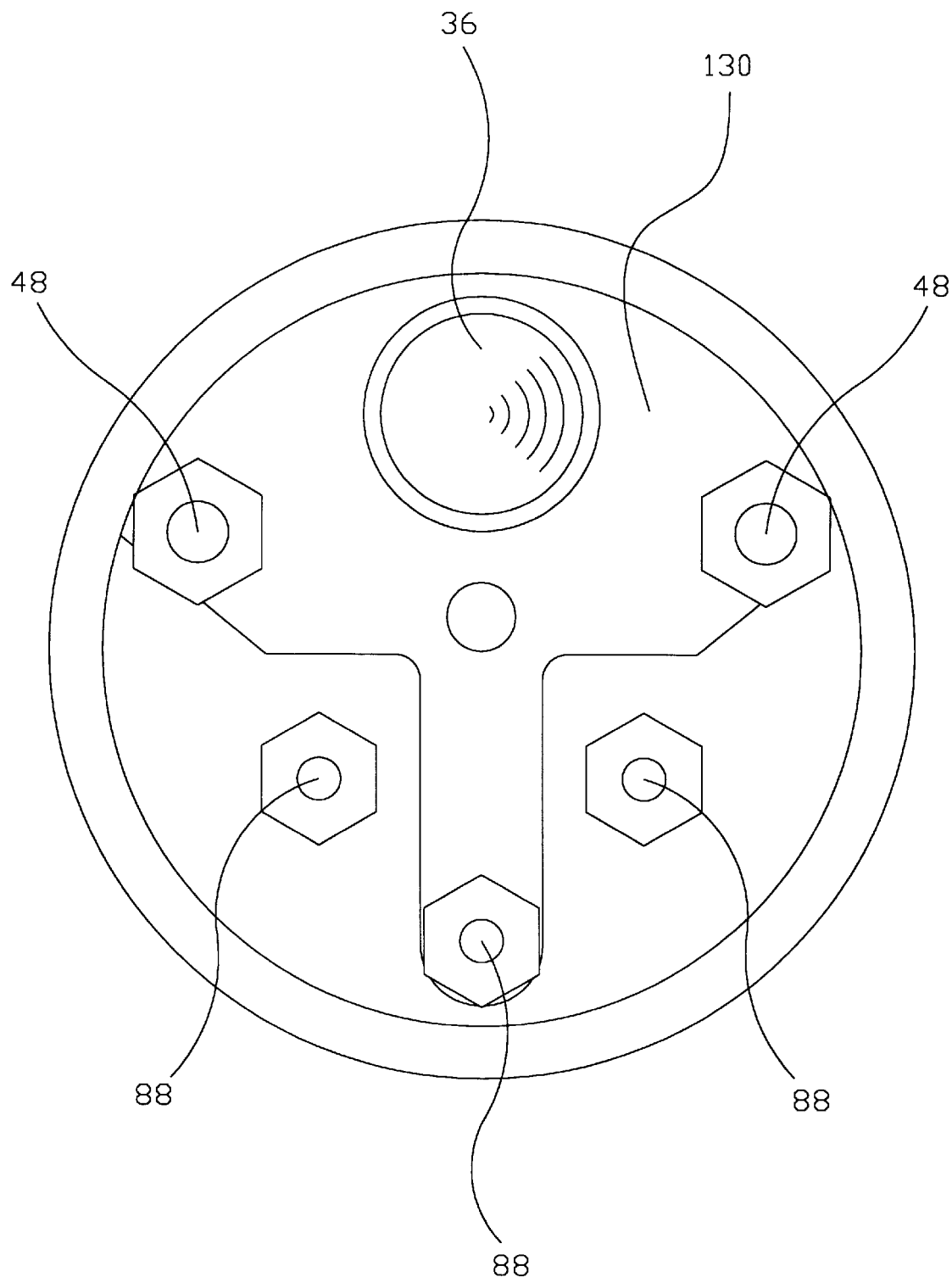
FIG. 3 is a rear elevation view of the gauge of FIG. 1.

Referring to FIGS. 1, 2, and 3, indicating subassembly 122 is housed in case 22 with threads 88, extending through orifices in case 22, providing connection points for exterior wiring sources. Threads 88 in combination with securement nuts 94 also hold subassembly 122 securely within case 22. Electrical input into subassembly 122 is received from a battery or power source (not shown) and from a sender (not shown). One lead of subassembly 122 is taken to ground. As best seen on FIGS. 1 and 6, plate 130 provides a conductive path so that lamp housing 46 is grounded through the lead of subassembly 122 that is taken to ground. Because mounting bolts 132 are securely attached directly to case 22, nuts 134 and appropriate hardware can be used to secure case 22 to a mounting surface.

Many modifications and variations of the above invention are possible. It is therefore understood that the invention may be practiced otherwise than as specifically before described and still fall within the scope of the appended claims.

What is claimed is:

1. A panel meter gauge comprising:
   (a) an outer case having an inner recess;
   (b) an electrical movement having a rotatable armature assembly disposed within a coil said coil being wound around a bobbin with shoulders, said movement having a spindle, said movement disposed within said inner recess and connected to an electrical lead passing through said outer case and being electrically insulated therefrom;
   (c) a dial having an aperture, said spindle passing through said aperture of said dial;
   (d) a circuit board having an orifice, said board having a light and a single dual comparator integrated circuit comparator circuit mounted thereon, said board being disposed within said inner recess between said movement and said dial with said orifice and said aperature being axially aligned with the spindle passing therethrough; said board being electrically connected to said electrical movement;
   (e) a gauge calibration resistor electrically connected to said comparator circuit to adjust gauge calibration;
   (f) a trimming resistor electrically connected to said comparator circuit to adjust the set point of said light; and
   (e) a crystal sealably fixed to the outer case so that said electrical movement, said circuit board and said dial are housed within said inner recess.

2. The panel meter gauge of claim 1 further comprising a pointer fixedly attached to said spindle so that rotation of said armature assembly causes said pointer to rotate.

3. The panel meter gauge of claim 2 in which the printed circuit board is a surface mount printed circuit board with an integral non-metallic face disposed toward said movement.

4. The panel meter gauge of claim 3 wherein said dual comparator integrated circuit is a National Semiconductor LM2903 or equivalent.

5. A method of making a panel meter gauge comprising:
   (a) inserting an electrical movement having a spindle into a case having a cavity and an opening;
   (b) placing a printed circuit board assembly, said board assembly having an orifice and a light and an electrical circuit mounted thereon, said electrical circuit further comprising a single dual comparator integrated circuit, a light, a gauge calibration resistor, and a trimming resistor to adjust the set point of said light;
   (c) positioning a dial having an orifice over said printed circuit board such that said dial orifice is juxtaposed over said light; and
   (d) fastening a crystal over said opening and said printed circuit board assembly.

6. The method of claim 5 further comprising:
   (a) placing a bobbin over an armature assembly having a spindle;
   (b) winding a coil around said placed bobbin;
   (c) fastening a dial to said case; and
   (d) pressing a pointer over said spindle.

7. The method of claim 6 further comprising calibrating the set point of the light by adjusting said trimming resistor on said board before fastening said crystal over said opening.

8. An indicating instrument system comprising:
   (a) a case having a recess, a closed end and an open end;
   (b) a rotatable armature assembly mounted within said recess and disposed toward said closed end, said assembly having a rotatable spindle extending toward said open end;
   (c) an electrical circuit mounted on a surface mount printed circuit board having a non metallic face, the board having an orifice so that said spindle extends through the orifice of said printed circuit board and said board is oriented with the non-metallic face toward said armature assembly, said electrical circuit having mounted thereon a single dual comparator integrated circuit comparator circuit, an indicating light, a gauge calibration resistor, and a trimming resistor to adjust the set point of said light said board being disposed within said recess and electrically isolated from said case but fixedly attached to said case;
   (c) a dial having a first and a second orifice fixedly attached over said circuit board, said spindle being disposed through said first orifice and said light being positioned beneath said second orifice when said dial is mounted over said board
   (d) a pointer pressed on said spindle so that when said spindle rotates, said pointer rotates and points to different locations on said dial;
   (e) a crystal disposed over said open end and fixedly attached to said case; and
   (f) a sender sending an analog electrical signal through a single lead to said electrical circuit.

9. The panel meter gauge of claim 3 in which said gauge calibration resistor is positioned on said non metallic board face and disposed between said bobbin shoulders.

\* \* \* \* \*